United States Patent
Benedetti et al.

(10) Patent No.: US 8,054,487 B2
(45) Date of Patent: Nov. 8, 2011

(54) MECHANISM TO CREATE A RESERVATION AGAINST A FUTURE SCHEDULING OBJECT INSTANTIATION

(75) Inventors: Fabio Benedetti, Rome (IT); Maria Pia Cagnetta, Rome (IT); David Bruce Kumhyr, Austin, TX (US); Pietro Iannucci, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1297 days.

(21) Appl. No.: 11/014,064

(22) Filed: Dec. 16, 2004

(65) Prior Publication Data
US 2006/0132828 A1    Jun. 22, 2006

(51) Int. Cl.
*G06F 3/12*    (2006.01)

(52) U.S. Cl. ...... 358/1.15; 358/1.13; 709/203; 709/206; 400/61

(58) Field of Classification Search .......... 358/1.15, 358/1.16, 1.13; 400/61; 379/265.05, 266.05; 709/203, 206; 714/4; 707/829; 702/108
See application file for complete search history.

(56) References Cited

U.S. PATENT DOCUMENTS

| | | | |
|---|---|---|---|
| 5,212,791 A | | 5/1993 | Damian et al. ............... 395/650 |
| 5,327,526 A | * | 7/1994 | Nomura et al. ............... 358/1.16 |
| 5,495,339 A | | 2/1996 | Stegbauer et al. ............ 358/296 |
| 5,640,505 A | * | 6/1997 | Hearn et al. ....................... 714/4 |
| 5,678,046 A | * | 10/1997 | Cahill et al. ................... 707/829 |
| 5,889,944 A | * | 3/1999 | Butt et al. ...................... 709/203 |
| 5,930,465 A | * | 7/1999 | Bellucco et al. ............. 358/1.15 |
| 6,487,513 B1 | * | 11/2002 | Eastvold et al. ............. 702/108 |
| 6,493,745 B1 | * | 12/2002 | Cherian ........................ 709/206 |
| 6,583,888 B1 | * | 6/2003 | Salgado et al. .............. 358/1.15 |
| 6,636,599 B1 | * | 10/2003 | Mullen .................... 379/265.05 |
| 6,667,810 B1 | | 12/2003 | Jeyachandran et al. ...... 358/1.14 |
| 6,863,455 B2 | * | 3/2005 | Blom et al. ...................... 400/61 |
| 2003/0028583 A1 | | 2/2003 | Flores et al. .................. 709/105 |
| 2003/0149717 A1 | | 8/2003 | Heinzman ..................... 709/101 |
| 2003/0158618 A1 | | 8/2003 | Browning ........................ 700/99 |
| 2006/0119883 A1 | * | 6/2006 | Lovat et al. .................. 358/1.15 |

FOREIGN PATENT DOCUMENTS

| | | |
|---|---|---|
| EP | 0 569 172 A2 | 11/1993 |
| WO | WO 00/29943 | 5/2000 |
| WO | WO2004/029805 | 4/2004 |

* cited by examiner

*Primary Examiner* — David K Moore
*Assistant Examiner* — Ashish K Thomas
(74) *Attorney, Agent, or Firm* — Yee & Associates, P.C.; Jeffrey S. LaBaw

(57) ABSTRACT

A method in a data processing system for managing jobs. A change to a job receiving that is un-instantiated. A reservation for the job is created. Instantiated jobs for an instance of the job are monitored corresponding to the reservation, and applying the change to the instance of the job responsive to identifying the instantiated job.

13 Claims, 4 Drawing Sheets

MECHANISM TO CREATE A RESERVATION AGAINST A FUTURE SCHEDULING OBJECT INSTANTIATION

BACKGROUND OF THE INVENTION

1. Technical Field

The present invention provides an improved data processing system, and in particular a method and apparatus for process data. Still more particularly, the present invention relates to a method, apparatus, and computer instructions for scheduling jobs.

2. Description of Related Art

Job scheduling software is a pervasive data center tool used to schedule jobs. A job is a task performed by a data processing system. The task may be, for example, printing a document or scanning a hard drive for viruses. Job scheduling involves establishing a job queue to run a sequence of programs over any period of time such as a single shift or a full day. A job queue contains a list of programs that are to be run. A program in a job queue is often referred to as an instantiated job. Multiple job objects for the same program or task are multiple job instances for a single type of job.

In executing jobs, operations are usually regular and unchanging. In some cases, it is desirable to apply a change to a job. Sometimes, it is only necessary to change or alter one instance of a job. Currently available systems allow an operator to identify a job in the current job stream that has not begun execution, but has been instantiated. When a job has been instantiated, some alterations may be applied to a job as it waits on a queue for execution. These alterations include, for example, changing the time when the job is to be run, changing the data processing system in which the job is to be executed, and changing a data source.

Operators, however, are unable to apply changes to jobs that have not yet been instantiated by a scheduling tool. When changes are need for un-instantiated jobs, an operator mush currently wait for the job to be instantiated through a normal planning cycle or through a triggering mechanism and then apply changes to the job. Such a situation is problematic and error prone. For example, a particular instance of a job may become instantiated and begin execution before the operator can apply changes to the job.

Therefore, it would be advantageous to have an improved method, apparatus, and computer instructions for scheduling and modifying jobs that have not yet been instantiated.

SUMMARY OF THE INVENTION

The present invention provides a technique to manage jobs in a data processing system. A change to a job receiving that is un-instantiated. A reservation for the job is created. Instantiated jobs for an instance of the job are monitored corresponding to the reservation, and applying the change to the instance of the job in response to identifying the instantiated job.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
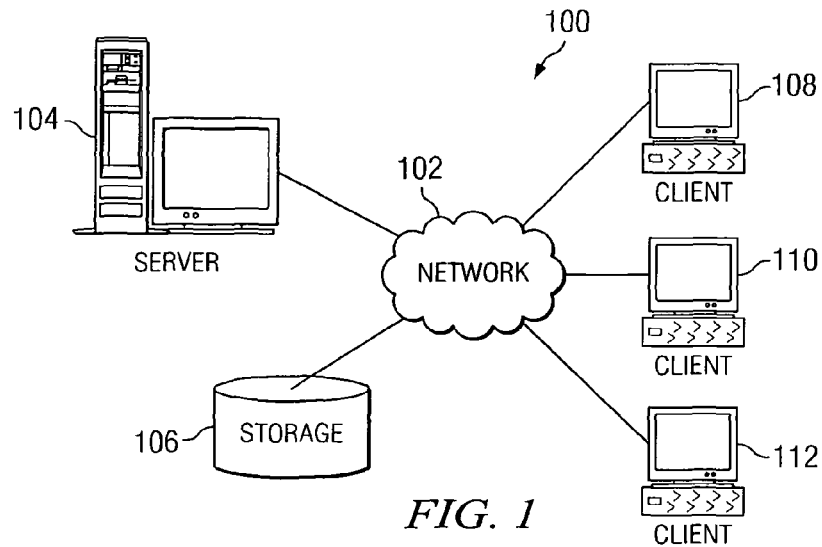
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
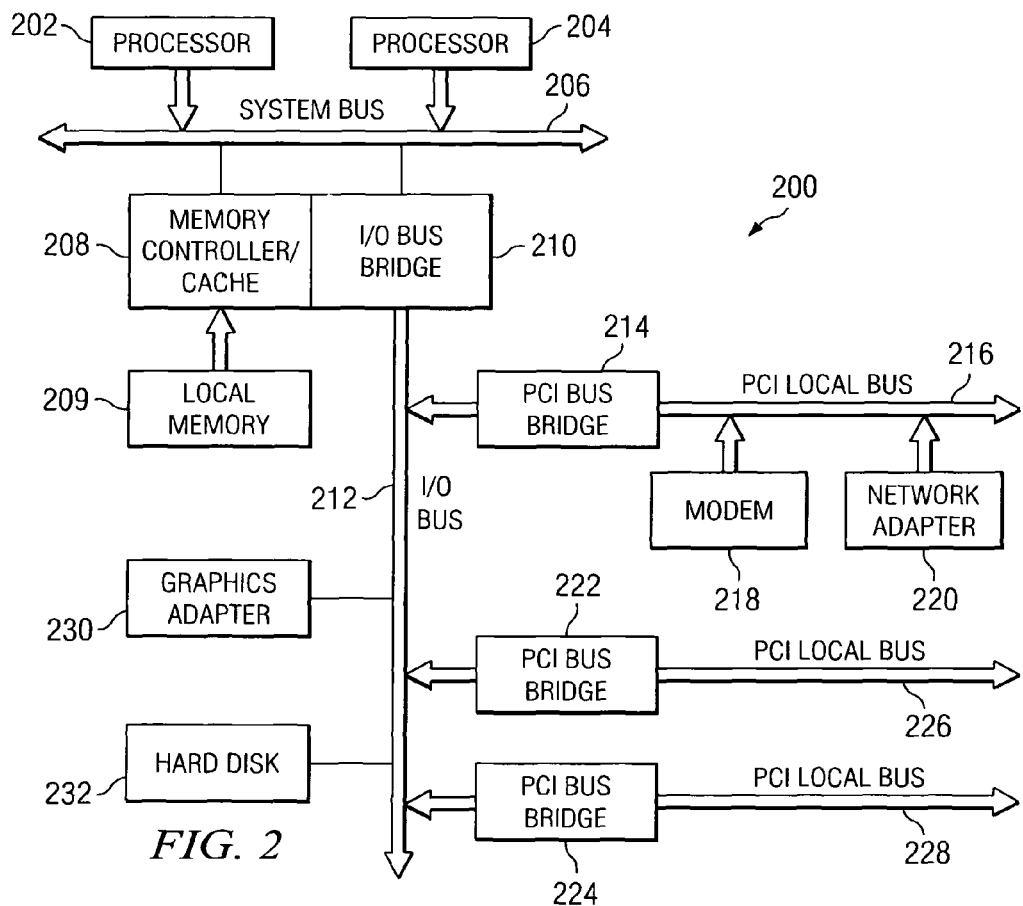
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
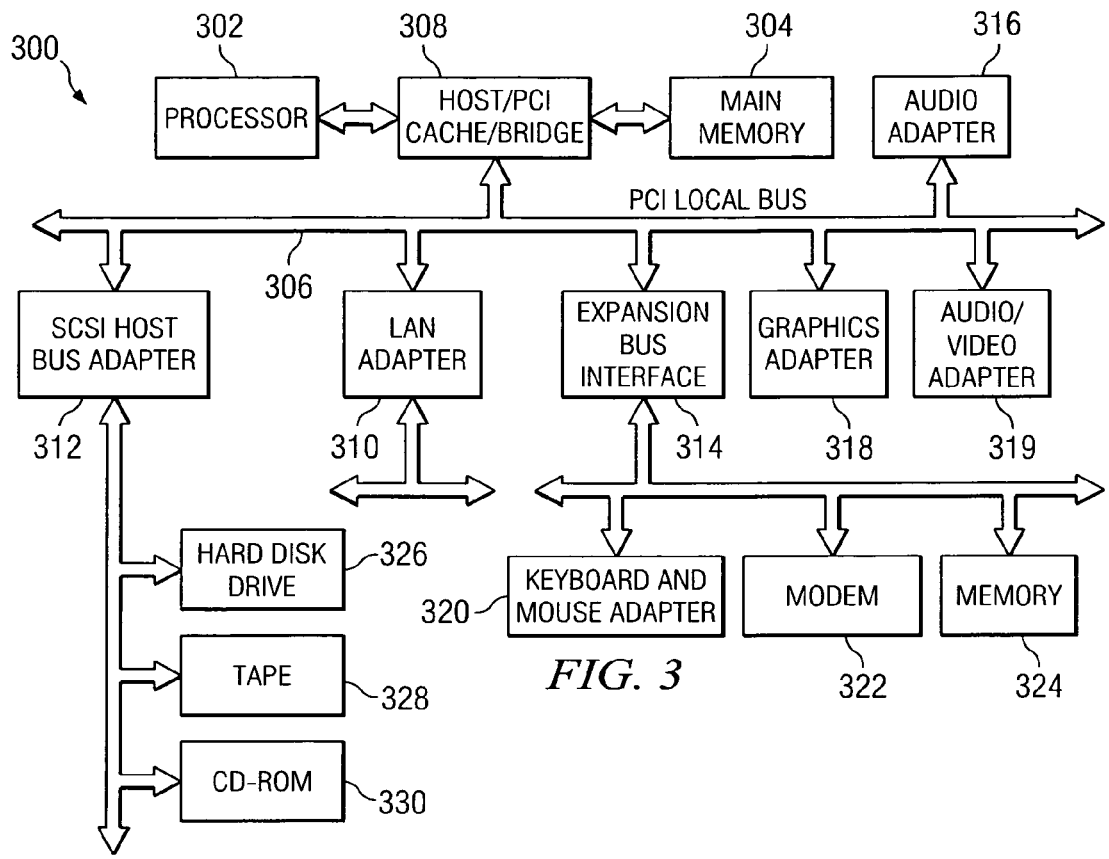
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for creating a reservation against future scheduling of an uninstantiated job. The mechanism of the present invention allows a user or operator to apply changes to jobs that have not been yet instantiated. An uninstantiated job is a job that is on a list used by a job scheduling program to establish a queue of instantiated jobs. An uninstantiated job merely includes an identification of the task that is to be run. An instantiated job is a job for which an object has been created. In other words, an uninstantiated job is an object that includes information needed to execute the task identified by the uninstantiated job. This object includes the different characteristics for the job. For example, the object may contain resources needed for the job, data files for use in performing the job, and an identification of when the job is to be executed. This object also includes, in these illustrative examples an identification of the program to be run to perform the task.

A job is instantiated by a scheduling process when the scheduling process looks at a list of jobs and determines that one or more jobs are to be place on a queue for execution. For example, a scheduling process may look at a list of all jobs and identify jobs to be run within the next 24 hours and instantiate all the jobs to be run for that time period. In another example, the scheduling process may instantiate a job in response to some condition, such as a particular time. Each instantiation of a job is referred to as a job instance. One particular job may have a number of different job instances that are to be executed within a period of time.

Figure 4:
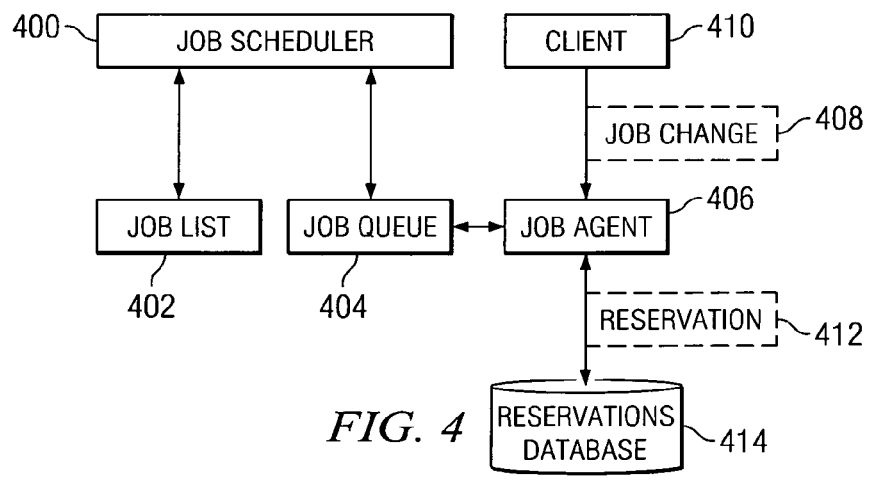
FIG. 4 is a diagram illustrating components used in scheduling jobs for execution in accordance with a preferred embodiment of the present invention.

Turning next to FIG. 4, a diagram illustrating components used in scheduling jobs for execution is depicted in accordance with a preferred embodiment of the present invention. Job scheduler 400 is a job scheduling process or program that schedules programs for execution found on job list 402. Job scheduler 400 may be implemented using currently available job scheduling systems. In these examples, the scheduling of jobs may occur using different schemes.

In one system, job scheduler 400 looks at all of the jobs on job list 402 and the condition for each job to determine whether to place a job on job queue 404. A job is instantiated when it is processed and placed on job queue 404. For example, if a job is to be run at 4:00 pm, job scheduler 400 continually checks job list 402 and places the job on job queue 404 when the time reaches 4:00 pm. Using another system, job scheduler 400 may place jobs that are to be run within a period of time, such as in the next 24 hours, on job queue 404 from job list 402.

With the mechanism of the present invention, job agent 406 is provided to receive job change 408 for a job on job list 402 that is not on job queue 404 from client 410. Job change 408 is a change to an attribute for an un-instantiated job. In response to receiving job change 408, job agent 406 creates reservation 412, which is stored in reservations database 414. This change may be applied to a number of different attributes for a job. For example, job change 408 may change a scheduled time for running the job, change a data processing system to execute the job, and/or change a data source.

In the illustrative examples, job agent 406 monitors instantiated jobs on job queue 404 to determine whether any of these job instances corresponds to a reservation in reservations database 414. When a job instance on job queue 404 matches or corresponds to a particular reservation, job agent 406 modifies that instance of a job as specified by the reservation. For example, the reservation may put the job on hold or change the data source for the job. This reservation may apply to a single instance of a job or multiple instances of a job.

In this manner, scheduling operator may create reservations to alter jobs. Existing reservations in reservations database 414 may be changed or deleted. A user may also query reservations database 414 to determine what reservations have been defined.

Figure 5:
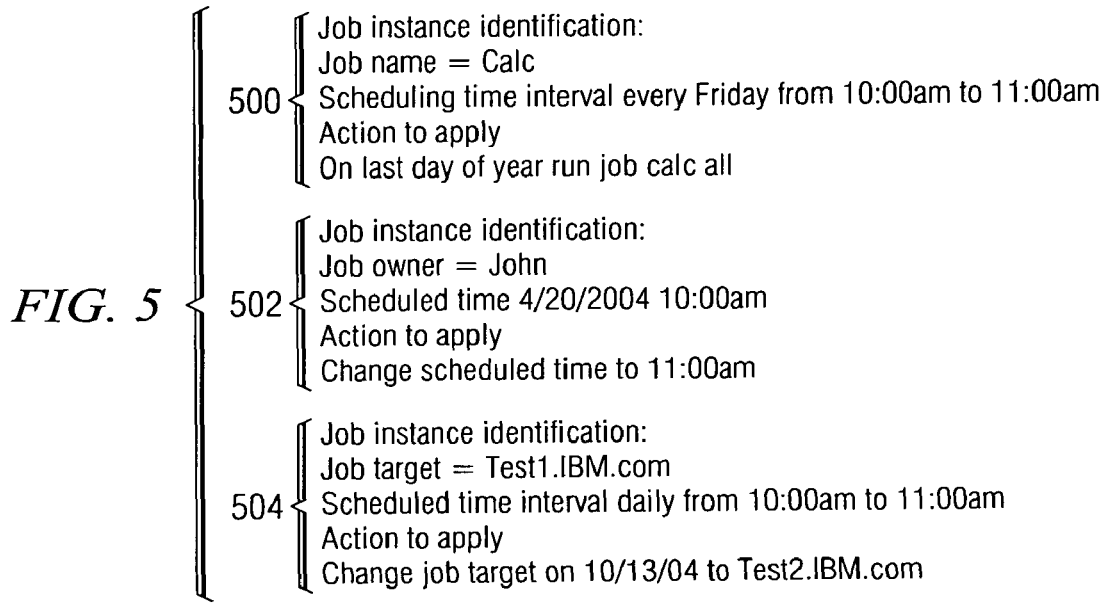
FIG. 5 are examples of reservations in accordance with a preferred embodiment of the present invention.

Turning now to FIG. 5, examples of reservations are depicted in accordance with a preferred embodiment of the present invention. These reservations are examples of reservations such as those found in reservations database 414 in FIG. 4. Reservation 500 in this instance changes the job "Calc" to run a different job name on the last day of the year. Reservation 502 changes a job scheduled to run at 10:00 am on a particular day to run at 11:00 am. Reservation 504 changes each job instance run on a daily basis to use a different server. Reservation 504 shows how a number of job instances may be changed.

Figure 6:
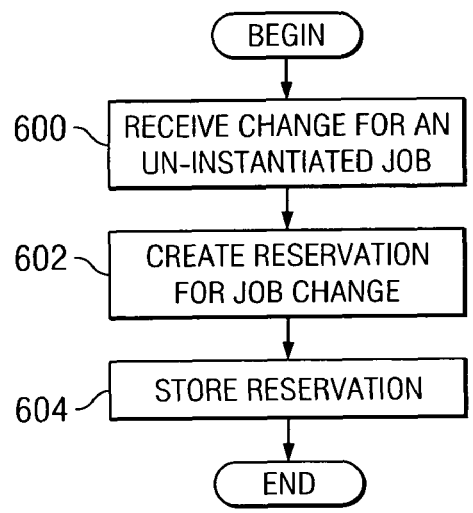
FIG. 6 is a flowchart of process for storing reservations for job changes in accordance with a preferred embodiment of the present invention.

Turning to FIG. 6, a flowchart of process for storing reservations for job changes is depicted in accordance with a preferred embodiment of the present invention. The process illustrated in FIG. 6 may be implemented in an agent or program, such as job agent 406 in FIG. 4.

The process begins by receiving a change for a un-instantiated job (step 600). A reservation is created for a job change (step 602). In step 602, the reservation may take the form of reservation 500 in FIG. 5. The reservation is stored (step 604) thus terminating the process. The reservation may be stored in a database or other data structure, such as reservations database 414.

Figure 7:
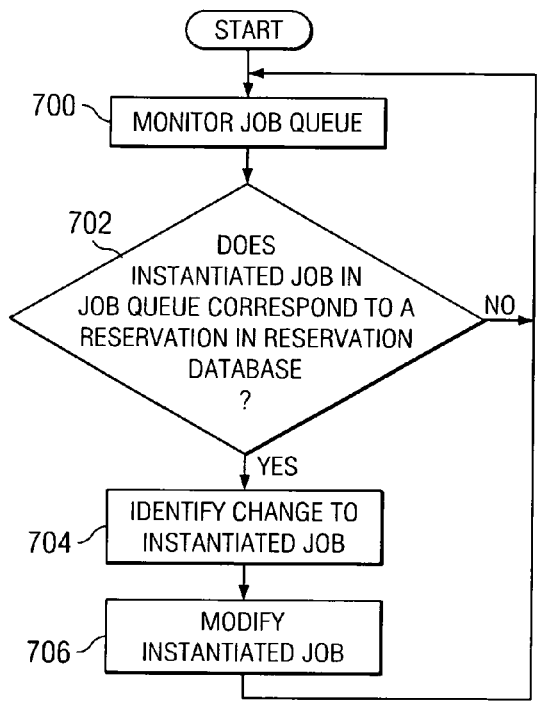
FIG. 7 is a flowchart of a process for monitoring instantiated jobs in accordance with a preferred embodiment of the present invention.

In FIG. 7, a flowchart of a process for monitoring instantiated jobs is depicted in accordance with a preferred embodiment of the present invention. The process illustrated in FIG. 7 may be implemented in an agent or program, such as job agent 406 in FIG. 4.

The process begins by monitoring a job queue (step 700). This job queue may be job queue 404 in FIG. 4. A determination is made as to whether an instantiated job in the job queue corresponds to a reservation in a reservation database (step 702). The determination in step 702 may be made by comparing a job name in the reservation with the job name of instantiated jobs on a job queue. If a corresponding job is present, any changes to an instantiated job are identified from the reservation (step 704). The instantiated job in the job queue is modified (step 706) with the process returning to step 700 to monitor job queue.

Turning back now to step 702, if a determination is made that a job in job queue corresponding to a reservation in reservation database is not present, the process returns to step 700 to continue to monitor job queue.

Figure 8:
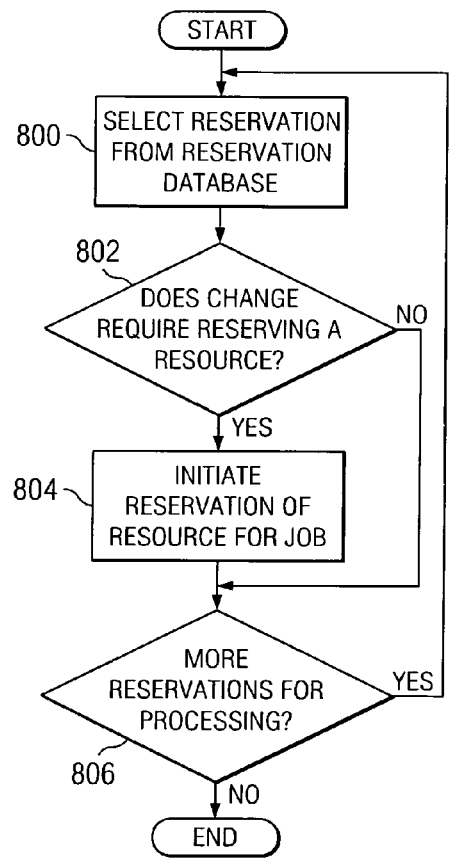
FIG. 8 is a flowchart for processing reservations in accordance with a preferred embodiment of the present invention.

Turning now to FIG. 8, a flowchart for processing reservations is depicted in accordance with a preferred embodiment of the present invention. The process illustrated in FIG. 8 may be implemented in an agent or program, such as job agent 406 in FIG. 4.

The process begins by selecting a reservation from a reservation database (step 800). A determination is made as to whether a change requires reserving a resource (step 804). This resource may be, for example, a particular server or group of servers. If reserving a resource is required, the process initiates reservation of the resource for a job (step 804). This reservation may be initiated by sending a request to an operator or administrator. Alternatively, the request may be sent directly to the resource itself. A determination is then made as to whether more reservations are present for processing (step 806). If additional reservations are not present, the process terminates.

Turning back step 802, if the change does not require reserving a resource, the process proceeds to step 806 to check for more reservations for processing. In step 806, if a reservation for processing is present, the process returns to step 800 to select a reservation from reservation database.

Thus, the present invention provides an improved method, apparatus, and computer instructions for altering the execution of jobs. This mechanism allows a user to create a reservation against a future scheduling of a job that has not yet been instantiated. This reservation is used by a job process or agent to alter the job when the job is actually scheduled and becomes instantiated. In this manner, greater flexibility in managing jobs is provided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for managing jobs, the method comprising:
scheduling an uninstantiated job on a job list;
receiving a change to the uninstantiated job;
responsive to receiving the change to the uninstantiated job, generating a reservation within a reservation database, wherein the reservation comprises modifications to be made to a job instance corresponding to the uninstantiated job;
monitoring a queue of instantiated jobs for the job instance corresponding to the uninstantiated job; and
responsive to identifying the job instance in the job queue of instantiated jobs, modifying the instance of the job with the modifications from the reservation.

2. The computer implemented method of claim 1, wherein the changes to the job includes attributes of the job to be changed.

3. The computer implemented method of claim 1, further comprising storing the generated reservation in a database.

4. The computer implemented method of claim 3, further comprising:
selecting a reservation from the database; and
determining whether the selected reservation includes a change that requires reserving a resource.

5. The computer implemented method of claim 4, wherein the resource comprises a server.

6. A data processing system for managing jobs, the data processing system comprising a processor and a memory communicatively coupled to the processor, the memory storing instructions comprising:
scheduling means for scheduling an uninstantiated job on a job list;
receiving means for receiving a change to the uninstantiated job;
generating means, responsive to receiving the change to the uninstantiated job, for generating a reservation within a reservation database, wherein the reservation comprises modifications to be made to a job instance corresponding to the uninstantiated job;
monitoring means for monitoring a queue of instantiated jobs for the job instance corresponding to the uninstantiated job; and
modifying means, responsive to identifying the job instance in the job queue of instantiated jobs, for modifying the instance of the job with the modifications from the reservation.

7. The data processing system of claim 6, wherein the changes to the job includes attributes of the job to be changed.

8. The data processing system of claim 6, further comprising storing the generated reservation in a database.

9. A non-transitory computer recordable-type medium, in a data processing system, storing instructions for managing jobs, the computer recordable medium comprising:
first instructions for scheduling an uninstantiated job on a job list;
second instructions receiving a change to the uninstantiated job;
third instructions, responsive to receiving the change to the uninstantiated job, for generating a reservation within a reservation database, wherein the reservation comprises modifications to be made to a job instance corresponding to the uninstantiated job;
fourth instructions for monitoring means for monitoring a queue of instantiated jobs for the job instance corresponding to the uninstantiated job; and;
fifth instructions, responsive to identifying the job instance in the job queue of instantiated jobs, for modifying the instance of the job with the modifications from the reservation.

10. The non-transitory computer recordable-type medium of claim 9, wherein the change to the job includes attributes of the job to be changed.

11. The non-transitory computer recordable-type medium of claim 9, further comprising storing the generated reservation in a database.

12. The non-transitory computer recordable-type medium of claim 11, further comprising fifth instructions:
selecting a reservation from the database; and
determining whether the selected reservation includes a change that requires reserving a resource.

13. The non-transitory computer recordable-type medium of claim 12, wherein the resource comprises a server.

* * * * *